(12) United States Patent
Feher

(10) Patent No.: US 7,937,789 B2
(45) Date of Patent: *May 10, 2011

(54) CONVECTIVE CUSHION FOR BEDDING OR SEATING

(76) Inventor: Steve Feher, Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/319,397

(22) Filed: Jan. 6, 2009

(65) Prior Publication Data

US 2009/0126110 A1 May 21, 2009

Related U.S. Application Data

(63) Continuation of application No. 11/243,604, filed on Oct. 5, 2005, now Pat. No. 7,480,950, which is a continuation-in-part of application No. 11/225,605, filed on Sep. 13, 2005, now abandoned.

(51) Int. Cl.
A47C 27/00 (2006.01)
(52) U.S. Cl. .................. 5/423; 5/714; 5/421; 5/941
(58) Field of Classification Search .............. 5/423, 714, 5/421, 941
See application file for complete search history.

(56) References Cited

U.S. PATENT DOCUMENTS

| | | |
|---|---|---|
| 2,407,933 A | 9/1946 | Neely |
| 3,136,577 A | 6/1964 | Richard |
| 4,394,784 A | 7/1983 | Swenson et al. |
| 4,777,802 A | 10/1988 | Feher |
| 4,884,304 A | 12/1989 | Elkins |
| 4,923,248 A | 5/1990 | Feher |
| 5,002,336 A | 3/1991 | Feher |
| 5,033,136 A | 7/1991 | Elkins |
| 5,117,638 A | 6/1992 | Feher |
| 5,335,381 A | 8/1994 | Chang |
| 5,597,200 A | 1/1997 | Gregory et al. |
| 5,626,021 A | 5/1997 | Karunasiri et al. |
| 5,837,002 A | 11/1998 | Augustine et al. |
| 5,839,654 A | 11/1998 | Weber |
| 5,924,766 A | 7/1999 | Esaki et al. |
| 6,062,641 A | 5/2000 | Suzuki et al. |
| 6,085,369 A | 7/2000 | Feher |
| 6,119,463 A | 9/2000 | Bell |
| 6,189,966 B1 | 2/2001 | Faust et al. |
| 6,516,624 B1 | 3/2001 | Ichigawa |
| 6,263,530 B1 | 7/2001 | Feher |
| 6,581,224 B2 | 9/2002 | Yoon |

(Continued)

OTHER PUBLICATIONS

PCTUS2006-34587 International Search Report (Dated Oct. 5, 2007).

(Continued)

Primary Examiner — Michael Trettel
Assistant Examiner — William Kelleher
(74) Attorney, Agent, or Firm — Robert J. Lauson; Lauson & Tarver LLP

(57) ABSTRACT

A cushion heated convectively using a positive temperature coefficient of resistance type resistive heating includes a mattress pad, seat or the like with a bottom surface secured around its perimeter to an air permeable top surface, forming a plenum and containing tubular spacer material or other air flow structure therein. The plenum is connected to a power unit housing a blower, a heating module and a controller unit. The heating module includes a PTC type heating element. A remote control is provided, and a foldable antenna attachable to the convective unit facilitates wireless communication with the controller unit. The user resting atop the cushion controls the blower and heating module to deliver air of a desired temperature and quantity to the cushion and through the top surface.

20 Claims, 5 Drawing Sheets

U.S. PATENT DOCUMENTS

| | | | |
|---|---|---|---|
| 6,546,576 | B1 | 4/2003 | Lin |
| 6,607,010 | B1 | 8/2003 | Kashy |
| 6,840,576 | B2 | 10/2003 | Ekern et al. |
| 6,687,937 | B2 | 2/2004 | Harker |
| 6,893,086 | B2 | 2/2004 | Bajic et al. |
| 6,935,122 | B2 | 8/2005 | Huang |
| 6,954,944 | B2 | 10/2005 | Feher |
| 7,036,163 | B2 | 5/2006 | Schmid |
| 7,124,593 | B2 | 10/2006 | Feher |
| 2003/0150060 | A1 | 8/2003 | Huang |
| 2005/0067862 | A1 | 3/2005 | Iqbal et al. |

OTHER PUBLICATIONS

Feher; 980661, Stirling Air Cond. Variable Temperature Seat (SVTS) . . . ; Copyright 1998 Society of Automotive Engineers, Inc. pp. 1-9.

Feher; 931111, Thermoelectric Air Condo Variable Temperature Seat (VTS) . . . ; Copyright 1998 Society of Automotive Engineers, Inc. pp. 341-349.

Office Actions from related U.S. Appl. No. 11/097,941; dated May 4, 2007 and Sep. 4, 2007.

Office Actions from related abandoned U.S. Appl. No. 08/298,457; dated Sep. 27, 1995 and Mar. 27, 1996.

Office Actions from related U.S. Appl. No. 09/126,914 (US 6,263,530); dated Oct. 12, 1999.

Office Actions from related U.S. Appl. No. 08/710,959 (US 6,085,369); dated Apr. 17, 1997; Oct. 16, 1997; Mar. 30, 1998; and Dec. 23, 1998.

EP301606 Office Action, dated Sep. 24, 2003 from related U.S. Appl. No. 08/710,959 (US 6,085,389).

Office Actions from related U.S. Appl. No. 11/243,604; dated Feb. 6, 2007, Jul. 9, 2007, Dec. 4, 2007, Jul. 9, 2008.

PCT Report on Patentability mailed Mar. 18, 2008.

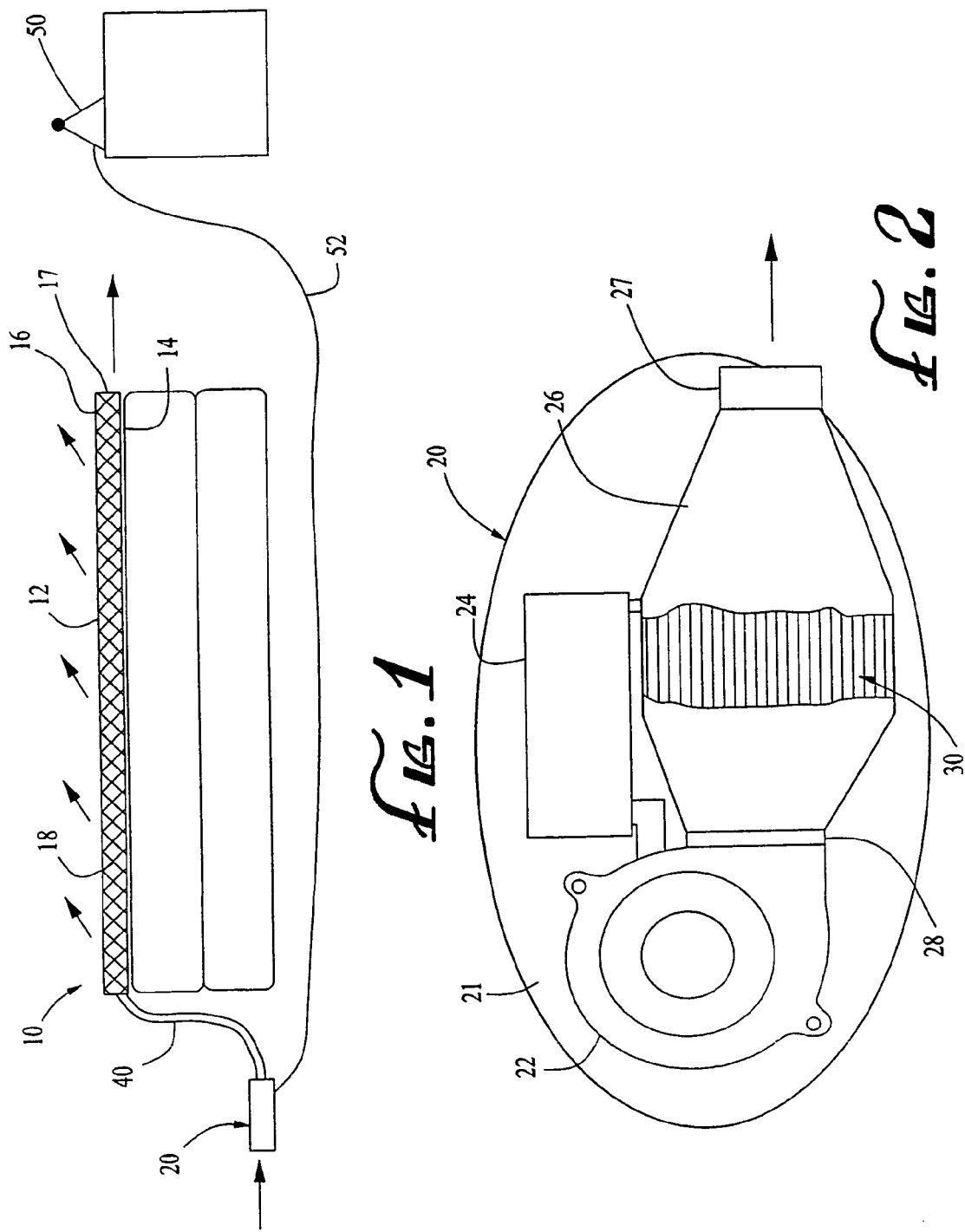

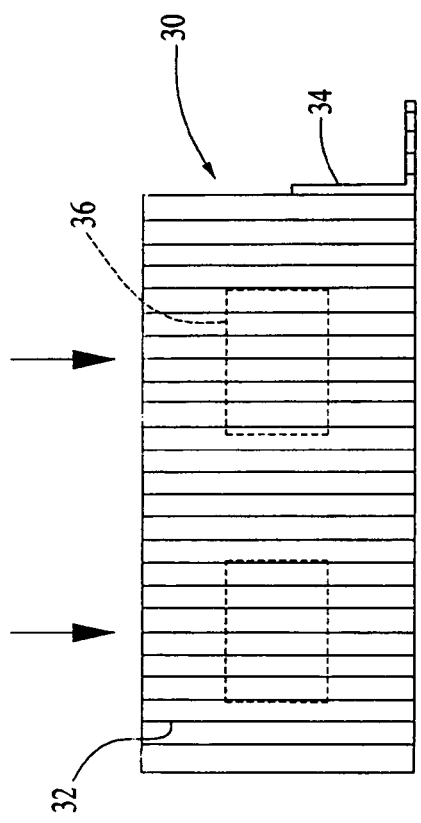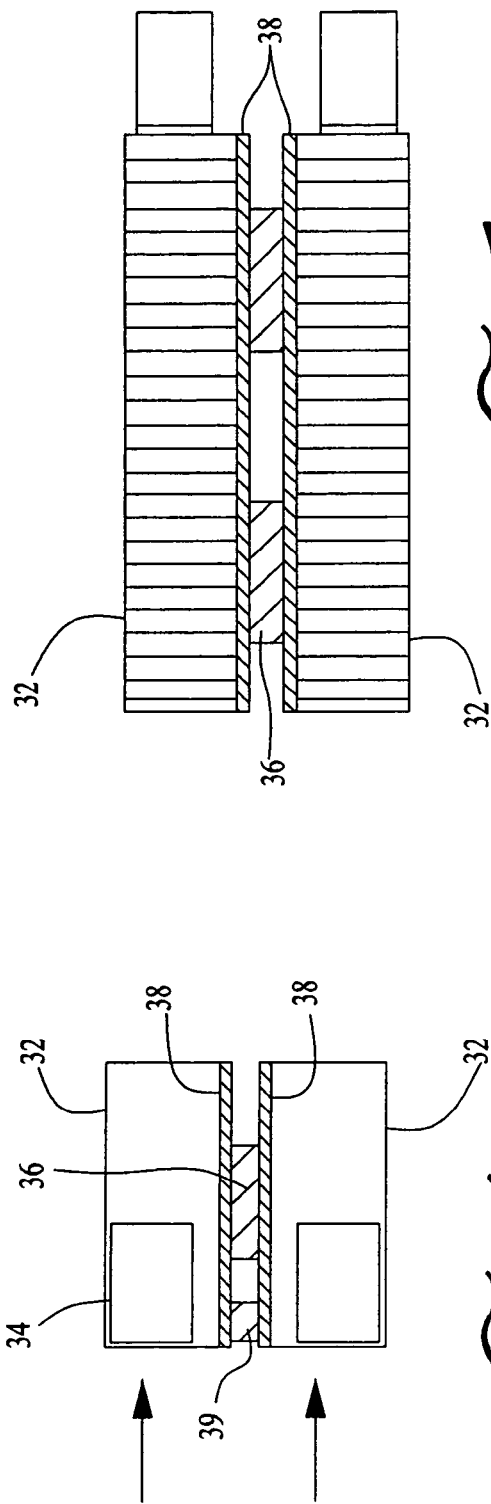

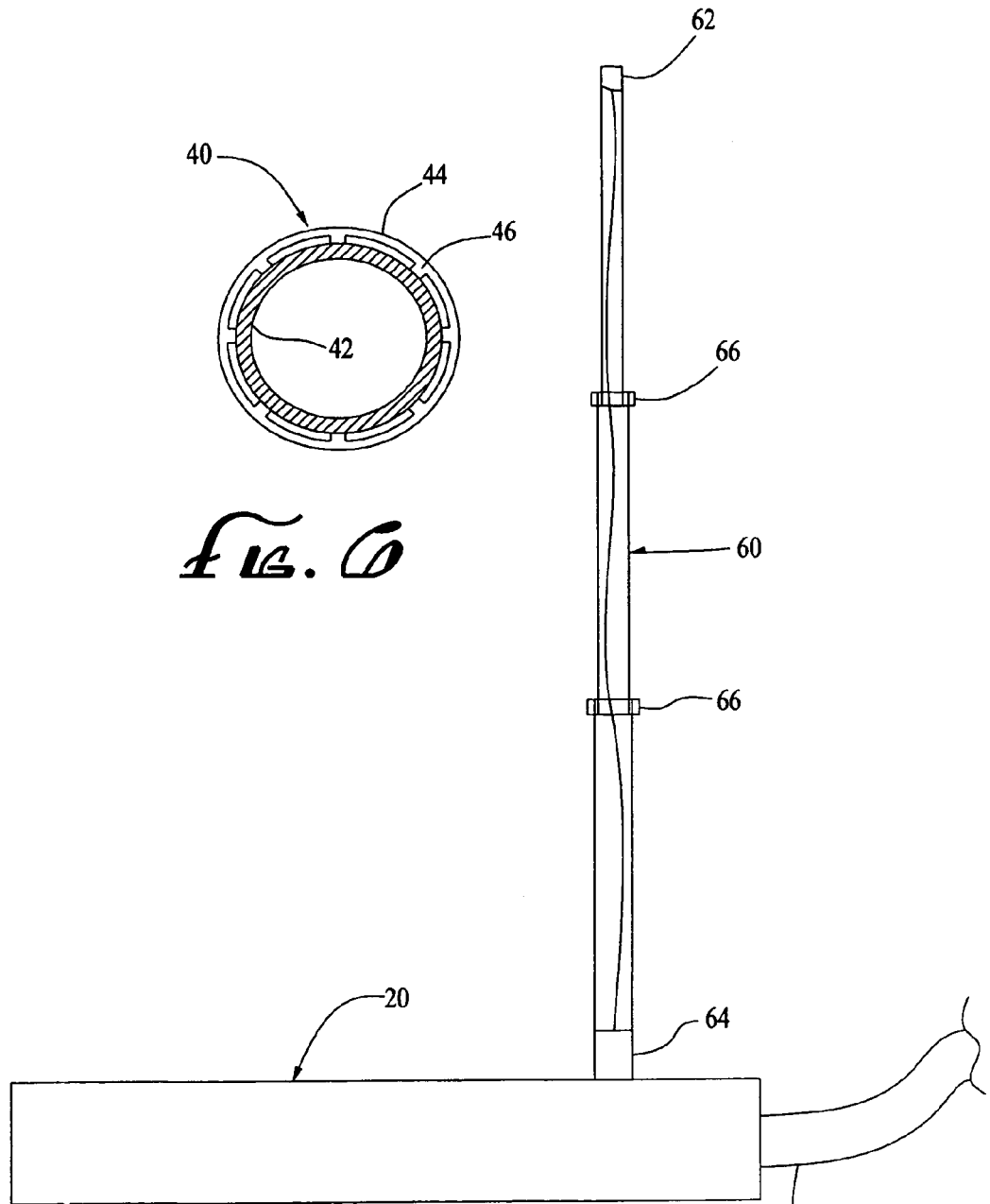

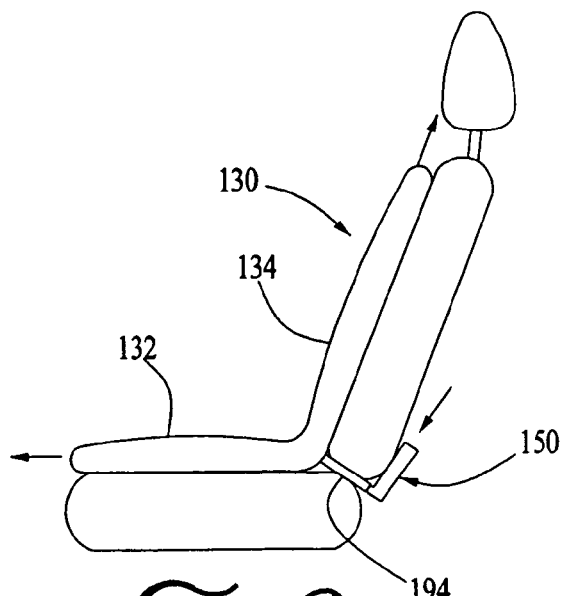
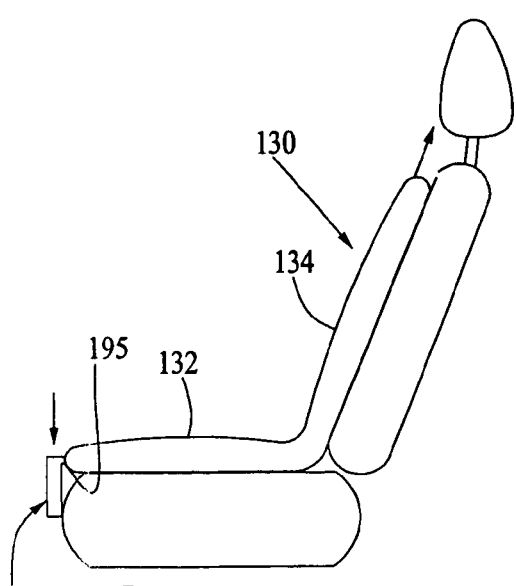 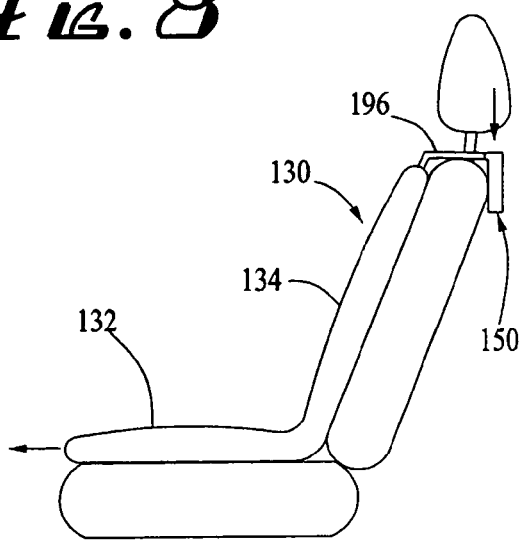

CONVECTIVE CUSHION FOR BEDDING OR SEATING

CROSS-REFERENCE TO RELATED APPLICATIONS

This application is a continuation of application Ser. No. 11/243,604 filed Oct. 5, 2005 now U.S. Pat. No. 7,480,950 entitled "Convective Cushion With Positive Coefficient Of Resistance Heating Mode," which is a continuation-in-part of utility patent application Ser. No. 11/225,605 filed Sep. 13, 2005 of the same title, now abandoned.

BACKGROUND OF THE INVENTION

1. Field of the Invention

The present invention relates to temperature controlled mattress pads, seats or other cushions, and more particularly to such a cushion that is heated by a positive temperature coefficient (PTC) element and ventilated as well.

2. Description of the Related Art

Resistance wires oftentimes with PTC (positive temperature coefficient) resistive elements are the conventional way of heating a cushion by conduction. This suffers from certain disadvantages, however, including that the electrical conductors are located within the cushion itself. Over time, the wires, carbon fiber strips or the like being subject to repeated weight loads and mechanical stresses may become physically damaged causing sparks from short circuits, and an occasional fire. Voltages as low as 6V can produce noticeable sparking, even at current levels in the 1-200 milliamp range.

Insulation is commonly used in the prior art, not only to limit peak heating at the conductor but also to spread the heating effect out (or average it) over the surface to be heated. The disadvantage here is that it takes longer to reach an adequate heating level, because of the drop in heating efficiency caused by the insulation. The overall efficiency of the heating apparatus is compromised as the insulation slows the heating of the outer surface of the cushion.

Other problems with the prior art heated cushions include operator errors in sewing the wire into the cushion leading to warranty claims. When wire mats are used they are generally not air permeable, preventing the ventilating of the seat as proposed herein by Applicant. Further, the wires rarely cover the entire seat, for example the side bolsters are usually non-heated. Finally, the wires in the seats may be incompatible with vehicle occupancy detectors, e.g. various air-bag and seat belt sensors.

Additionally, resistance heated type, prior art mattress pads don't offer cooling or ventilation. This is a major disadvantage in many parts of the world where the population lacks means such that air-conditioning is unavailable and a substantial portion of the year relaxing or sleeping is uncomfortable due to very warm ambient air conditions.

3. Objects of the Invention

Accordingly, it is an object of the present invention to construct a temperature-controlled cushion that is heated without the conventional resistance wires or PTC resistive elements in conductive mode within the cushion itself.

It is a further object of the present invention to construct such a cushion while minimizing the use of insulation or eliminating its use altogether.

It is a still further object of the present invention to provide such a cushion that also includes a ventilated mode.

It is a still further object of the present invention to provide such a cushion that includes convenient controls for the user.

It is a still further object of the present invention to provide such a cushion that is simple and relatively inexpensive to manufacture.

It is a still further object of the present invention to provide an accompanying power unit that is quiet and compact and located outside the cushion.

These and other objects of the present invention will become apparent upon reference to the following detailed description and accompanying drawings.

SUMMARY OF THE INVENTION

Disclosed is a new approach for a cushion that is heated convectively preferably using a positive coefficient of resistance type resistive heating element that is provided with one or more heat exchangers. The present invention includes a mattress pad, seat or other cushion with a bottom surface secured around its perimeter to an air permeable top surface (forming a plenum or air-flow structure) and containing tubular spacer material or equivalent therein. The plenum has an opening for a (preferably insulated) air duct which leads to a power unit housing a blower, a heating module and a controller unit. Besides obvious uses in the home or an automobile, the invention as disclosed herein may also be used for patient warming in medical and surgical settings.

The heating module includes the PTC type heating element in conduction with a heat exchanger. Preferably the heating element is sandwiched between a number of heat exchangers, and there is a seal therebetween to minimize air flow from the blower from passing there between. A remote control for the user's convenience may be provided and a foldable antenna attachable to the convective unit facilitates wireless communication between the remote control and controller unit, although corded remote control may also be utilized or the controls located on the power unit itself. The power unit may include multiple PTC elements (including elements of varying wattage and switch temperatures) to allow the user to more precisely control the output temperature of the air, and may include a speed control for the blower.

The user resting atop the cushion is able to control the blower and heating module to deliver air of a desired temperature and quantity to the cushion and through the top surface. The advantages of the subject invention over the prior art in heating mode for mattress pads, seats and other cushions are substantial. Since there are no current conducting wires or carbon fiber strips within the cushion structure, the convective cushion is much safer than the prior art when used as a mattress pad. This is because the PTC heating element is located remotely from the cushion and is connected to the cushion only with an air duct hose, eliminating all mechanical stress to any electrical wires from weight applied to the sleeping or seating surface. Because the heating medium is air, and not hot current conductor wires, straps, carbon fibers or the like, it isn't necessary to use insulation to spread the heating effect over the entire surface of the cushion. By using air, the heating effect is gentle and effective without the need for insulation, so the overall heating mode efficiency is higher and more evenly distributed over the heated surface.

The present invention, besides replacing basic electric resistance wire heated mattress pads as well as other resistance element heated cushions, also offers a feature that the prior art cannot using the same equipment and that is a ventilation mode for warm weather. By causing ambient air to move within the air flow structure (which is much more efficiently done with tubular spacer fabric as described elsewhere herein, and in U.S. Pat. Nos. 6,263,530 and 6,085,369, but can be done less efficiently with other air flow structure materials), a meaningful percentage of excess body heat can be removed during warm weather while the user is seated on or sleeping on the cushion of the subject invention.

As long as ambient temperature is below the user's body skin temperature (which averages out to approximately 96 degrees Fahrenheit over much of the body), there must (according to Newton's Law of thermal transfer), be a thermal exchange between the source of heat at a higher temperature (body skin surface), and a heat sink at a lower temperature, by ambient air under forced convection (macrocosmically) and free convection (microcosmically). The terms macrocosm and microcosm simply refer to the relatively large bulk air flow (or forced convection), produced through the cushion air flow structure by the blower and the relatively very small air convection movement (free convection), produced at the microcosmic level by the delta T or difference in the relatively warm air nearest the user's skin and the relatively cool air brought into close proximity via forced convection. The microcosmic level is that level within the padding and textiles which is the interface between the user and the air flowing through the cushion.

BRIEF DESCRIPTION OF THE SEVERAL VIEWS OF THE DRAWINGS

FIG. 1 is a side elevation view of the convective cushion of the preferred embodiment of the present invention placed atop a conventional mattress;

FIG. 2 is a plan view of the convective unit with a portion of the housing removed to show its contents;

FIG. 3 is an enlarged plan view of the PTC resistive heating element 30;

FIG. 4 is an end view of the assembly of FIG. 3;

FIG. 5 is another side elevation view of the same assembly, in the air flow direction, looking through the heat exchanger fins;

FIG. 6 is a cross-sectional view of the air duct;

FIG. 7 is a side view of the convective unit with an optional attachable folding antenna with an attached air duct hose 40 to convey conditioned air to the cushion.

FIG. 8 is a side view of a convective seat cushion for a vehicle with a compact power unit installed at the bite line between the seat and backrest in accordance with an alternate embodiment;

FIG. 9 is a side view of the power unit optionally installed at the front of the seat;

FIG. 10 is a cross-sectional view of the power unit optionally installed at the top of the backrest;

Figure 11:
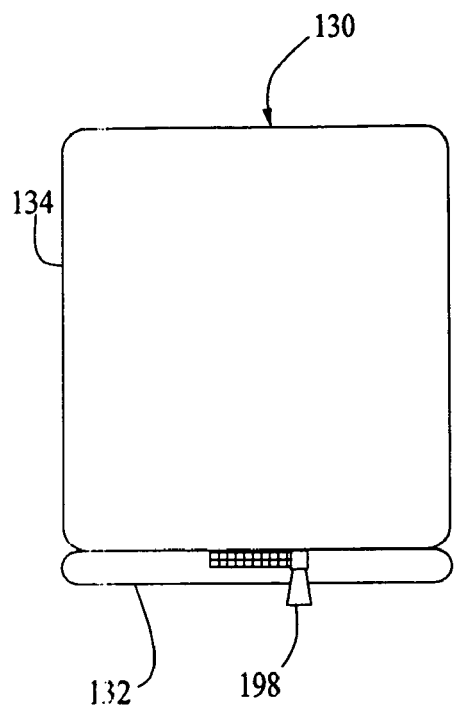
FIG. 11 is a front elevation view of the cushion with a damper valve for regulating the airflow.

LISTING OF REFERENCE NUMERALS convective cushion 10
plenum 12
air impervious bottom surface 14
air-permeable top surface 16
vent 17
tubular spacer material 18
power unit 20
housing 21
blower 22
circuit board box 24
adaptor 26
air outlet 27
air duct inlet 28
PTC resistive heating element 30
heat exchanging fins 32
power terminals 34
PTC heating element 36
base plates 38
air seal or gasket 39
air duct hose 40
flexible air duct 42
insulated sleeve 44
sleeve splines 46
remote IR sensor, detector 50
length of wire 52
articulated folding strut, antenna 60
IR sensor 62
adapter plug 64
hinge points 66
vehicle seating cushion 130
seat rest 132
backrest 134
compact power unit 150
straight air duct 194
special air duct 195
special duct 196
ZIPPER™ valve or damper 198

DESCRIPTION OF THE PREFERRED EMBODIMENTS

Initially referring to FIG. 1, shown is the convective cushion 10 placed upon a conventional mattress, including a plenum 12 constructed of a bottom surface 14 secured around its perimeter to a top surface 16. The bottom surface 14 is preferably air impervious, although placement on a conventional mattress may render an air permeable surface largely impervious. The top surface 16 is air-permeable although sufficiently impervious that a greater air pressure can be maintained inside the enclosed space.

Inside the plenum 12 is tubular spacer material 18 or equivalent. U.S. Pat. Nos. 6,085,369 and 6,263,530 pioneered the use of such tubular spacer fabric 18 as an air flow structure for seats, mattresses, mattress pads, and other articles of furniture that can be sat on or laid down upon. Although the preferred embodiment of this invention utilizes the same tubular spacer fabric 18 as described in the issued Feher '369 and '530 patents, it is possible to utilize other air flow structures such as Muller Textile's 3 Mesh or Strahle and Hess' assembled woven tube fabric, as well as any other air flow structure; however there may be substantially reduced levels of performance when compared to tubular spacer material 18 as disclosed in the above U.S. patents and herein.

FIG. 2 shows a power unit 20 for the convective cushion 10, which includes a blower 22 for blowing air across multiple or a single PTC resistive heating module 30 including heat exchanging surfaces 32 (see FIGS. 3-5), and pushing the air into the plenum 12 for heating the cushion 10. Alternatively, the PTC module 30 need not be energized, resulting in a ventilating function as a result of circulating ambient air through the cushion air flow structure or plenum 12. The PTC heating module 30 with heat exchanging fins 32 is located in an adaptor 26 that matches the module 30 to the blower air outlet 27 and the air duct inlet 28 in the most aerodynamically efficient manner within the space limitations of the power unit 20 housing 21 dimensions. Details such as a power cord and plugs and sockets are not shown.

Also shown in FIG. 2 is a box 24 for any necessary or desired electrical circuits for mode switching, switching between multiple heaters, on and off, etc., plus wireless remote control circuits if desired. A speed control printed circuit board may be incorporated in the space 24 shown in FIG. 2, which could be used to control heating as well as ventilation by coordinating PTC elements with AC or DC power control to regulate air flow, offering more flexibility in comfort settings than the simplest form which relies solely on the PTC switch temperature characteristics of the PTC elements with a fixed air flow rate.

The box 24 may optionally include a Triac or other semiconductor power control for the PTC heating elements to enable the PTC elements to operate below their switch temperature design point. The PTC element switch temperature is the temperature at which the resistance starts to rise exponentially. The elements 36 are called Positive Temperature Coefficient because, unlike NTC, or Negative Temperature Coefficient type materials, the electrical resistivity rises with increasing temperature, instead of dropping with increasing temperature. Most materials exhibit PTC characteristics because increasing temperature causes more ionic movement, crystal lattice vibration, and/or molecular motion, any of which can interfere with electron mobility. The switch temperature of ceramic PTC devices is determined by the amount of doping with certain elements, such as strontium, for example, before firing.

In order to operate the PTC heating elements 36 below their design point switch temperature it is necessary to either increase the heat load beyond the capabilities or rating of the elements, by increasing air flow beyond the design point for example, or by reducing voltage to the elements, which reduces the power rating of the elements relative to the load. For a mattress pad application of the convective cushion 10 it may be more desirable to use a power reduction instead of an air flow increase, in order to maintain a very low noise level for a comfortable sleeping environment.

FIG. 3 shows the PTC heating module 30 with heat exchanging fins 32 running in the Y axis and power terminals 34 on the right side. Two PTC elements 36 can be seen, represented by dashed lines, mounted in the middle of the heat exchangers 32. The preferred PTC elements 36 are rated 50 Watts each and 120 VAC, with a switching temperature of about 38-45 deg. C. max., and are manufactured by Advanced Thermal Products, Inc. of Saint Mary's, PA. Other elements with different power and voltage ratings can be used; however the above is the preferred embodiment at least for the mattress pad because it is unnecessary to produce air at more than about 45 deg. C. max. to affect good heating performance. and using elements rated for 120 VAC eliminates the need for a power supply which reduces the cost of the product while increasing product reliability. If a more powerful heating effect is desired, it is a simple matter of using higher rated elements or more of the same power rated elements 36.

FIGS. 4, 5 show the PTC heating elements 36 mounted between two base plates 38 of the heat exchangers 32. These plates 38 are heavier than the fins 32 and serve to spread the heat outward from the PTC heating elements 36 to the far edges of the heat exchangers 32 as efficiently as possible without excessive thickness and weight. An air seal or gasket 39 is also shown in this view the purpose of which is important. The seal 39 prevents air flow between the two heat exchangers 32, which forces all of the air flow through the fins 32, increasing thermal transfer efficiency. The reason that this became an issue was that the thickness of the PTC heating elements rated for 120 VAC is twice that of PTC heating elements rated for 12-24 VDC. The extra thickness results in a gap of sufficient size to permit excessive air flow between the two heat exchanger base plates 38. The seal 39 addresses this issue to produce a more efficient apparatus that operates reliably at or very close to the switch temperature.

The PTC heating module assembly 30 can be made with a single heat exchanger 32; however such an arrangement would not be as efficient from a thermal point of view. The heat exchangers 32 are preferably made of copper, although aluminum or any other thermally and electrically conductive material can also be used. Although solder can be used to bond the PTC heating elements 36 to the heat exchanger base plates 18, a flexible adhesive with good thermal and electrical conductivity is preferred to prevent excessive stress buildup and possible PTC element 36 cracking due to differences in coefficient of thermal expansion (CTE) between the PTC heating element 36 material and the heat exchanger 32 material, which can be substantial, for example, approximately 10:1 for the PTC elements 36 and copper.

Referring back to FIG. 1, the mattress pad power unit 20 may be mounted on the floor remote from the cushion, with a flexible air duct hose 40 attached to one end of the convective cushion 10, which is preferably at the foot of the bed. Although it is possible in some instances to introduce air into the convective cushion 10 at the head of the bed it is preferred to put the air in at the foot of the bed for several reasons. The power unit 20 is designed to be very quiet, however it is not totally silent so the father away it is from the user's ears the better. For heating mode, the extremities tend to require more heating than the trunk of the body; therefore putting the warmed air in at the foot puts the warmest air in at the place where it's needed most, the extremities, or feet and legs. Lastly, there may not be enough space between the bed and the wall at the head of the bed to accommodate the air duct hose 40.

FIG. 1 shows how some of the air percolates or vents up through the cushion 10, which is enclosed in a plenum or textile envelope 12 and secured to, in this case, a bed, resulting in ventilating or heating air flowing under the covers (not shown), however most of the ventilating or heating air flows through the cushion 10 air flow structure 18 and vents out at the end 17 opposite from where it entered.

FIG. 1 also shows how to achieve an infra-red type remote control with the convective cushion 10 as a mattress pad. Ordinarily, the power unit 20 is placed on the floor at the foot of the bed in order to enable a short length of air duct hose and to minimize blower noise perceived by the user. Unfortunately, this places the power unit 20 out of the line of sight of an infra-red (IR), type remote control, which is less expensive than a radio frequency (RF), type remote. The more expensive RF remote has the advantage of not requiring a line of sight to function. Shown is connecting a remote IR sensor, or detector 50, to the power unit 20 with a length of wire 52 (most beds are at least 6 feet in length, so the length of wire 52 needed is at least that long, plus approximately three feet for slack), to enable the user to use an IR remote (not shown) without a line of sight to the power unit 20. Alternatively, either an IR or RF type remote may be designed to be used with the PTC power unit 20 in order to enable control of ventilation, or heating, and degrees of ventilation and heating, without the need for a cord connecting the remote to the power unit 20.

The solution of FIG. 7 is to place an IR sensor 62 on the end of an articulated folding strut, or antenna 60, attached to the power unit 20. When the antenna 60 is unfolded vertically, the user has a line of sight to the IR detector or sensor 62, enabling use of the IR type remote control. The IR sensor strut 60 should be capable of extending vertically at least 24 inches or more, and can be attached to the power unit 20 permanently or can use an adapter 64 to plug into the power unit 20 housing before or after unfolding. A telescopic strut (not shown) could also be used, but managing the wire on the inside during collapse of the telescopic type of antenna is more complex and bulky than using a folding strut 60 with rotary electrical contacts at the hinge points 66. The folding antenna 60 design can be such that the middle leg folds to nest within the top leg and the bottom leg folds to nest within the middle leg, etc. The legs can be made of flat strips of metal or plastic with the top leg overlapping the middle one and so on. Power to the sensor 62 and signals from the sensor 62 can be transmitted to the control circuit 24 in the power unit 20 via either wires in the antenna 60 or via the arms of the antenna 60 and a third wire if the arms are made of conductive material or if they are provided with conductive circuit traces and rotating contacts in the joints.

FIGS. 1, 6 and 7 show the PTC heater assembly 30 with blower 22 connected to the mattress pad 10 via a length of flexible air duct 40. A good example of such an air duct 42 is known as Uniloop, made by Flexhaust, Inc. It is important for good performance of the preferred embodiment 10 to ensure that there is low heat loss in the air duct 42 in cold weather and in heating mode. Although there are numerous materials and techniques that can be used to make a flexible insulated air duct for the purposes of the subject invention, one example is to make an insulation sleeve 44 for the Uniloop air duct hose out of VOLARA®, made by Voltek Corp., which is a polymeric foam with very small closed cells enabling a relatively high R rating, or insulation rating for a relatively thin material cross section. In this case a VOLARA® sleeve or layer approximately 0.08" thick produces very good results. A preferred form of the VOLARA® insulation sleeve 44 would be extruded with internal splines 46 as shown in FIG. 6 to create small air gaps between the sleeve 44 and the air duct 42 to enhance the insulation performance of the sleeve with minimal bulk.

This is one way of making an insulated air duct hose 40 for the preferred embodiment 10 that remains flexible and non-bulky while enabling higher performance and efficiency for the subject cushion or mattress pad in heating mode under cold ambient air temperature conditions. However it is configured, an insulated air duct hose 40 is important for best cold weather heating mode performance, especially because the air delta T in heating mode is substantially higher than in ventilation mode, in which there is no delta T because ambient air is being used for ventilation.

Referring to FIGS. 8-14, an alternate embodiment vehicle seating cushion is described with the application of the PTC air heating and ventilating system to a seat cushion consisting of a seat rest and backrest capable of sustaining internal air flow that will communicate thermally and convectively with the user contacting surfaces, in communication with the PTC power unit air heating and ventilating system, via a variety of optional air pathways. As shown in FIG. 8, preferably a compact power unit 150 is installed proximate the "bite line" or separation between the seat rest 132 and backrest 134 portion of the cushion 130, with a straight air duct 194 running from the mouth 162 of the power unit 150 to the cushion 130. This set up is preferred as conditioned air entering the middle portion of the cushion 130 is more easily evenly distributed throughout the seat rest 132 and backrest 134. Alternatively, the power unit 150 can be installed forward of the seat rest 132 with a special air duct 195 (FIG. 9) or above and aft the backrest 134 with special duct 196 (FIG. 10). These configurations are useful for use with seats that do not have an opening or slot at the "biteline" between the seat and backrest cushion of the seat upon which the PTC cushion is to be installed, in order to facilitate installation of the cushion.

Note the airflow direction through the cushion 130 varies depending upon where the power unit 150 is placed, with the air primarily exiting the cushion 130 remote from the power unit 150. The set up with the power unit 150 forward the seat rest 132 is advantageous for ease of control in that the power unit 150 controls could be located directly on the unit 150 and easily accessible between the user's legs when seated on the cushion 130. When the power unit 150 is located aft of the user, a wired control extends to the user or to a location accessible to the user or a remote wireless control could be used.

Figure 12:
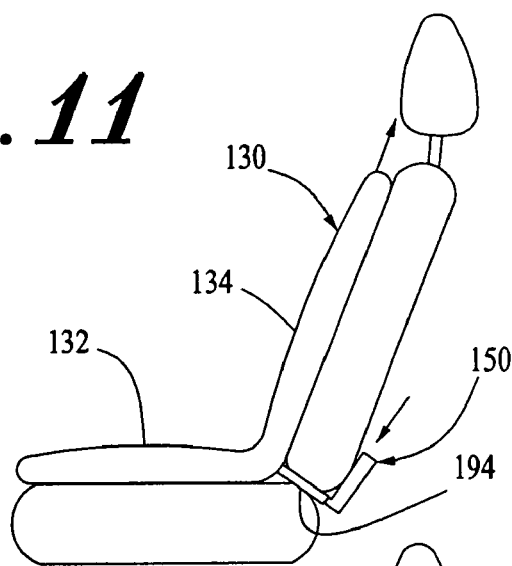
FIG. 12 shows the modified airflow of FIG. 8 when the damper valve is closed.
Figure 13:
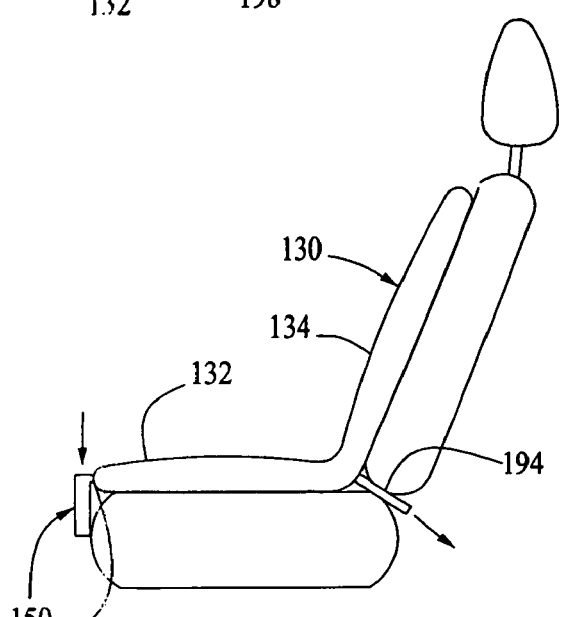
FIG. 13 shows the modified airflow of FIG. 9 when the damper valve is closed; and, FIG. 14 shows the modified airflow of FIG. 10 when the damper valve is closed.
Figure 14:
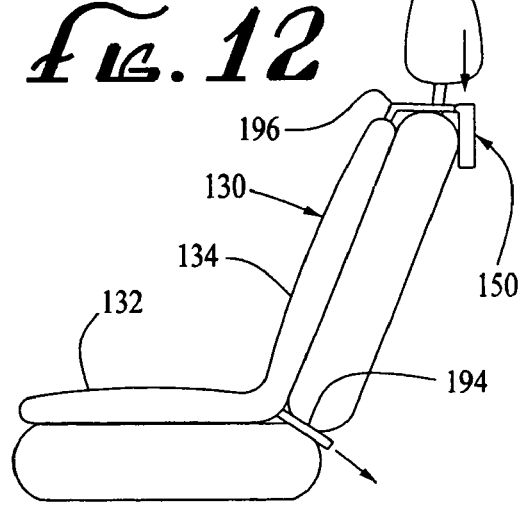

FIG. 11 shows a ZIPPER™ valve or damper 198 installed in the middle portion of the cushion 130. The damper valve 198 serves to control the air flow between the seat rest 132 and backrest 134 portions of the cushion 130. For example, when the power unit 150 is installed at the bite line and the valve 198 is completely closed, air flows primarily through the backrest 134 and not the seat rest 132 (FIG. 12). That is, in this preferred embodiment when the valve 198 is closed, a minimal amount of air flows into the seat rest 132 and the circulation is limited there, and most of the heat and ventilating effect is felt in the backrest 134 with a reduced effect in the seat rest 132. Other examples, when the power unit 150 is installed atop the backrest 134 and the valve 198 closed air flows again primarily through the backrest 134 (FIG. 13), or when the power unit 150 is installed forward the seat rest 132 and the valve 198 closed air flows primarily through the seat rest 132 (FIG. 14), in both these instances the air exiting the cushion 130 through the duct 194 at the bite line. It is also possible to open or close the valve 198 to intermediate positions in order to vary the thermal effect of the cushions, by controlling the amount of air flowing through the cushions. Moreover, the bite line duct 194 could also be closed off in any number of ways to direct more air through the backrest 134 or seat rest 132.

The present invention has been described in connection with preferred and alternate embodiments, but it is understood that modifications will occur to those skilled in the appertaining arts that are within the spirit of the invention disclosed and within the scope of the claims.

What is claimed is:

1. A convective cushion comprising:

a plenum defined by a laterally extending bottom surface and a laterally extending top surface secured around a perimeter extending transversely therebetween to contain an open air space, an air flow structure formed of flexible air permeable textile material having a plurality of tubular spacers disposed in the air flow space to guide air flow laterally therethrough, said air flow structure spacing the top surface from the bottom surface, said top surface adapted for convective air flow delivered from said air flow structure over substantially the entire top surface responsive to a flow of air blown laterally through said plenum, said top surface being sufficiently impervious to air to retain greater air pressure within the air flow space, said air flow structure maintaining a substantial portion of said flow of air within a venting air flow in a coplanar direction laterally between said top and bottom surfaces to be directed laterally outward through said plenum proximate said perimeter, a portion of the flow of air permeating said tubular spacers to vent through said top surface;

a power unit in fluid communication with the plenum, and housing a blower;

a controller unit in communication with the blower;

whereby a user resting atop the cushion is able to control the blower to deliver air as desired into the cushion to said air flow structure, to deliver said air as desired to said top surface producing the convective air flow over substantially the entire top surface.

2. The convective cushion of claim 1 wherein the blower is in fluid communication with a heating module of one or more positive temperature coefficient type, the controller being in communication with the heating module.

3. The convective cushion of claim 1 wherein the power unit is located outside the plenum and the plenum has an opening at one end, and further comprising an air duct with one end sized to be received into the plenum opening and a second end extending to the power unit.

4. The convective cushion of claim 2 wherein the heating modules comprise a heat exchanger in conduction with a positive temperature coefficient type heating element.

5. The convective cushion of claim 4 wherein the heat exchanger comprises a base plate coupled in thermally conductive manner to the positive temperature coefficient type heating element, and a plurality of heat exchanging fins.

6. The convective cushion of claim 5 wherein the heating element is sandwiched between a pair of the base plates coupled in thermally conductive manner and the plurality of heat exchanging fins.

7. The convective cushion of claim 6 further comprising a seal between the base plates to minimize air flow from passing therebetween.

8. The convective cushion of claim 1 further comprising a remote control in communication with the controller unit.

9. The convective cushion of claim 1 wherein the controller unit includes a speed control for the blower.

10. The convective cushion of claim 1 further comprising one or more vents in the perimeter of the plenum.

11. The convective cushion of claim 1 wherein the bottom surface of the plenum is generally air impermeable.

12. The convective cushion of claim 1 wherein the plenum is adapted to be inserted within a vehicle seat.

13. A mattress pad comprising:

a plenum defined by a laterally extending air permeable top surface secured around a perimeter extending transversely therebetween, the plenum containing an air flow space, an air flow structure formed of flexible air permeable textile material and having an opening at one end disposed in the air flow space, said air flow structure having a plurality of tubular spacers disposed below the top surface to guide air flow laterally through the air flow space, said top surface adapted for convective air flow delivered from said air flow structure over substantially the entire top surface responsive to the flow of air blown laterally into said plenum, said top surface being substantially impervious to air to retain greater air pressure within the air flow space, said air flow structure guiding a substantial portion of said flow of air to maintain a venting air flow passing in a coplanar direction laterally below said top surface to be directed laterally outward through said plenum perimeter, a portion of the flow of air venting through said top surface;

a power unit housing a blower in fluid communication with the plenum;

a controller unit in communication with the power unit; and, whereby a user resting atop the mattress pad is able to control the blower to deliver air as desired to the pad and to said air flow structure, to deliver said air as desired to said top surface to produce the convective air flow over substantially all of the top surface.

14. The mattress pad of claim 13 wherein the blower is in fluid communication with a heating module comprising a positive temperature coefficient type heating element in conduction with a heat exchanger.

15. The mattress pad of claim 14 wherein the heat exchanger comprises a base plate coupled in thermally conductive manner to the positive temperature coefficient type heating element, and a plurality of heat exchanging fins.

16. The mattress pad of claim 15 wherein the heating element is sandwiched between a pair of the base plates coupled in thermally conductive manner thereto and the plurality of heat exchanging fins.

17. The mattress pad of claim 16 further comprising a seal between the base plates to minimize air flow from the blower from passing therebetween.

18. The mattress pad of claim 13 further comprising a remote control in communication with the controller unit and including a speed control for the motor.

19. The mattress pad of claim 13 further comprising one or more vents in the perimeter of the plenum.

20. The mattress pad of claim 13 wherein the mattress pad is incorporated into a mattress.

* * * * *